United States Patent [19]

Sangregory et al.

[11] Patent Number: 5,748,989
[45] Date of Patent: May 5, 1998

[54] ONE-TIME-USE CAMERA WITH MANUAL CONTROL LEVER AND BI-DIRECTIONAL OVERCENTER SPRING FOR CLOSING MOVABLE LIGHT SHIELD OF FILM CASSETTE

[75] Inventors: Jude A. Sangregory, Spencerport; Douglas H. Pearson, Rochester, both of N.Y.

[73] Assignee: Eastman Kodak Company, Rochester, N.Y.

[21] Appl. No.: 841,952

[22] Filed: Apr. 8, 1997

[51] Int. Cl.[6] .................................................. G03B 17/02
[52] U.S. Cl. ............................................ 396/6; 396/538
[58] Field of Search .............................. 396/6, 512, 513, 396/514, 515, 516, 535, 538

[56] References Cited

U.S. PATENT DOCUMENTS

| | | | |
|---|---|---|---|
| 5,495,310 | 2/1996 | Takatori | 396/514 X |
| 5,500,705 | 3/1996 | Stephenson | 396/536 |
| 5,517,270 | 5/1996 | Balling | 396/536 |
| 5,550,608 | 8/1996 | Smart et al. | 396/538 |
| 5,555,063 | 9/1996 | Balling | 396/538 |

FOREIGN PATENT DOCUMENTS

| | | |
|---|---|---|
| 8-211558A | 8/1996 | Japan . |
| 8-211568A | 8/1996 | Japan . |

*Primary Examiner*—Howard B. Blankenship
*Attorney, Agent, or Firm*—Roger A. Fields

[57] ABSTRACT

A camera comprising a housing, a chamber within the housing for a film cassette which includes a light shield that is opened to allow movement of a filmstrip through a film passageway to the cassette interior and is closed to prevent ambient light from entering the cassette interior through the film passageway, and a driver rotatable within the housing in opening and closing directions in engagement with the light shield to open and close the light shield, is characterized in that a control lever connected to the driver can be rotationally positioned to protrude out of the housing from a slot in the housing, when the light shield is open, to permit the control lever to be grasped to be manual rotated in the closing direction, and can be positioned not to protrude out of the housing from the slot, when the light shield is closed, to substantially prevent the control lever from being grasped to be manually rotated in the opening direction.

6 Claims, 5 Drawing Sheets

ONE-TIME-USE CAMERA WITH MANUAL CONTROL LEVER AND BI-DIRECTIONAL OVERCENTER SPRING FOR CLOSING MOVABLE LIGHT SHIELD OF FILM CASSETTE

CROSS-REFERENCE TO RELATED APPLICATION

Reference is made to commonly assigned application Ser. No. 08/602,192, now U.S. Pat. No. 5,638,152, entitled BI-DIRECTIONAL SPRING DEVICE FOR OPENING AND CLOSING LIGHT SHIELD OF FILM CASSETTE and filed Feb. 16, 1996 in the names of Stanley W. Stephenson III and Thomas M. Seamans.

FIELD OF THE INVENTION

The invention relates generally to the field of photography, and in particular to cameras of the type intended to be used with a film cassette having a light shield that is opened to allow film movement into and out of the cassette interior and is closed to prevent ambient light from entering the cassette interior. More specifically, the invention relates to a camera with a manual control lever and an associated overcenter spring for closing the light shield of the film cassette.

BACKGROUND OF THE INVENTION

It is known to provide a film cassette with a light shield that can be closed to prevent ambient light from entering the cassette interior through a film passageway and can be opened to permit film movement out of and into the cassette interior through the film passageway.

For example, commonly assigned prior art U.S. Pat. No. 5,357,303, issued Oct. 18, 1994, and No. 5,359,378, issued Oct. 25, 1994, each disclose a film cassette including a plastic light shield that can be rotated closed to prevent ambient light from entering the cassette interior through a film passageway and can be rotated open to allow film movement out of and into the cassette interior through the film passageway, and an auxiliary driver device of a camera which is engageable with the light shield to rotate the light shield open and closed when the film cassette is loaded in the camera.

The Cross-Referenced Application

The cross-referenced application discloses a camera comprising a housing, a chamber within the housing for a film cassette which includes a light shield that is opened to allow movement of a filmstrip through a film passageway to the cassette interior and is closed to prevent ambient light from entering the cassette interior through the film passageway, and a driver rotatable within the housing in opening and closing directions in engagement with the light shield to open and close the light shield. An overcenter spring has one leg connected to the driver to move with the driver and another leg connected to a non-movable fixture within the housing to make the overcenter spring exert respective opening and closing torques against the driver in accordance with the rotational position of the driver to alternatively urge the driver in the opening and closing directions.

SUMMARY OF THE INVENTION

According to the invention, a camera comprising a housing, a chamber within the housing for a film cassette which includes a light shield that is opened to allow movement of a filmstrip through a film passageway to the cassette interior and is closed to prevent ambient light from entering the cassette interior through the film passageway, and a driver rotatable within the housing in opening and closing directions in engagement with the light shield to open and close the light shield, is characterized in that:

a control lever connected to the driver can be rotationally positioned to protrude out of the housing from a slot in the housing, when the light shield is open, to permit the control lever to be grasped to be manual rotated in the closing direction, and can be positioned not to protrude out of the housing from the slot, when the light shield is closed, to substantially prevent the control lever from being grasped to be manually rotated in the opening direction.

This design is preferably included in a one-time-use camera. In that type camera, it is not intended for the user to replace the film cassette with a fresh one.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
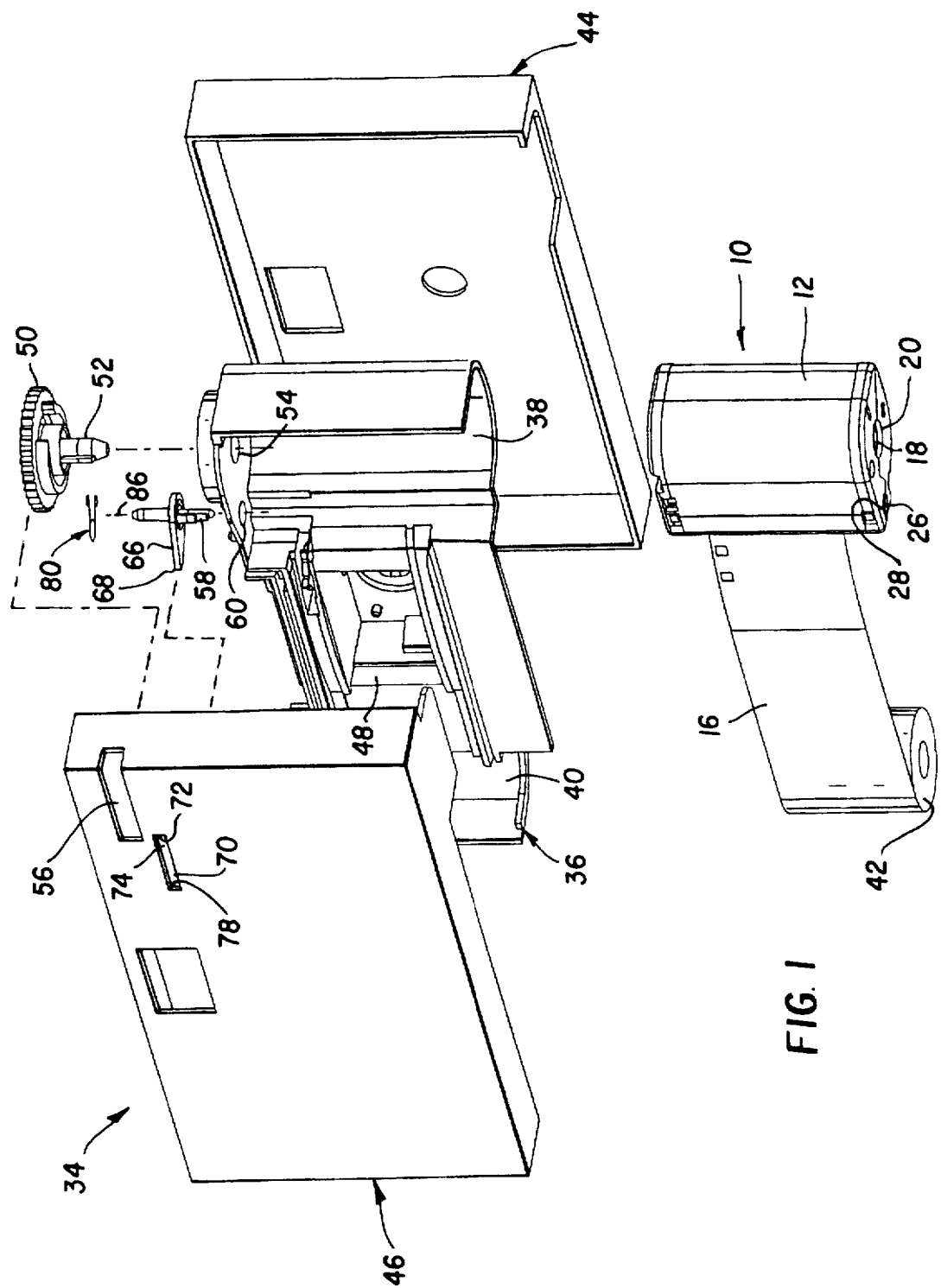
FIG. 1 is an exploded perspective of a camera with a manual control lever and an associated overcenter spring for closing a movable light shield of a film cassette, pursuant to a preferred embodiment of the invention.
Figure 2:
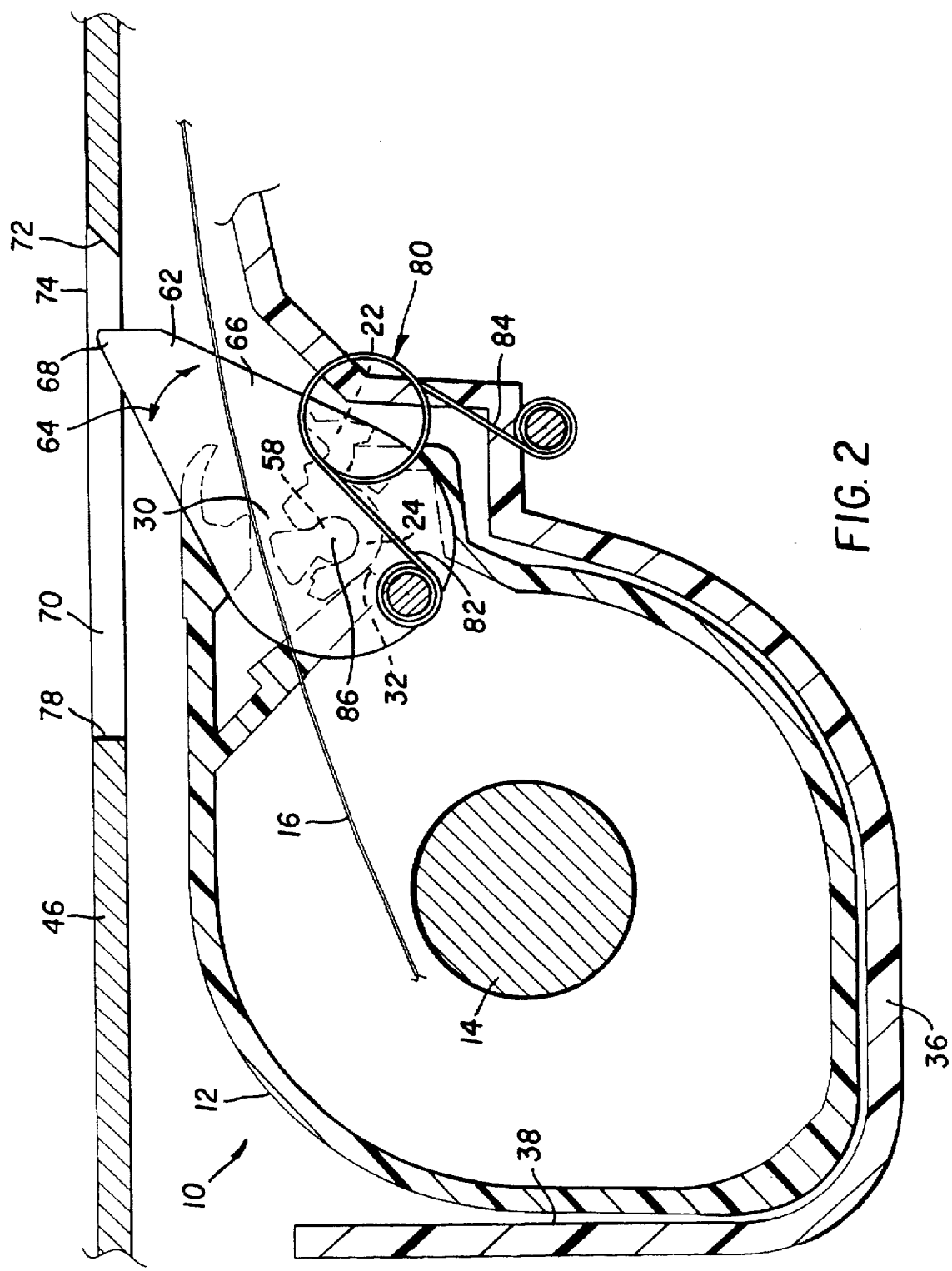
FIGS. 2, 3, 4, and 5 are cross-section views of the control lever and the overcenter spring, depicting their operation to close the light shield of the film cassette.
Figure 5:
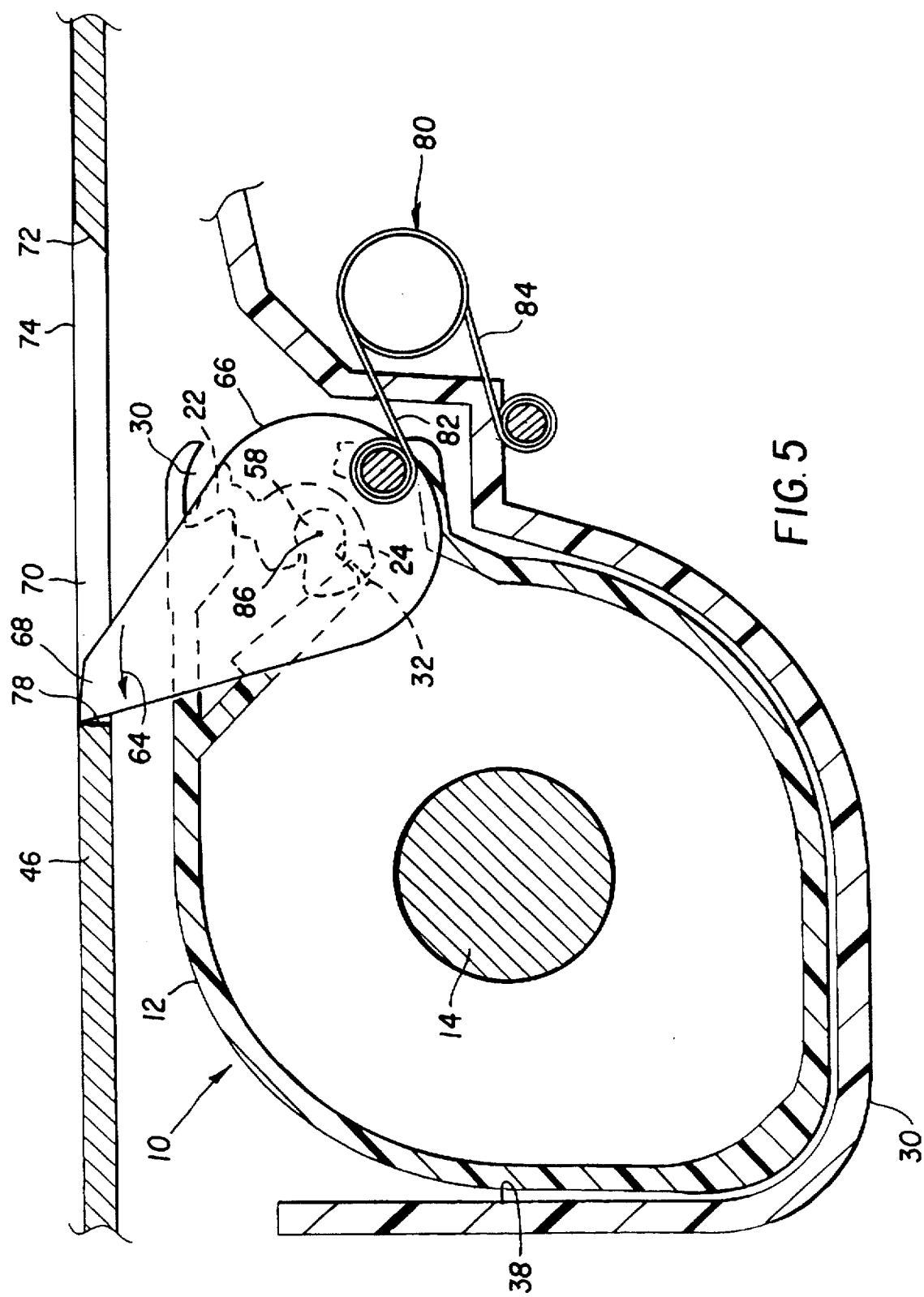

Referring now to the drawings, FIGS. 1 and 2 show a known film cassette 10 comprising a cassette shell 12 housing a flanged spool 14 to which one end of a filmstrip 16 is attached. The cassette spool 14 has opposite exposed ends (only one shown) 18 located in respective end holes (only one shown) 20 in the cassette shell 12 to support the spool for winding rotation. A light shield 22 has an integral shaft 24 which is supported at opposite exposed ends (only one shown) 26 in respective end holes (only one shown) 28 in the cassette shell 12, for the light shield to be pivoted open to allow movement of the filmstrip 16 through a film passageway 30 to the shell interior, as shown in FIG. 2, and to be pivoted closed to prevent ambient light from entering the shell interior through the film passageway when the filmstrip is removed from the film passageway, as shown in FIG. 5. A resiliently flexible locking pawl 32 integrally formed with the cassette shell 12 engages the light shield 22, when the light shield is closed as shown in FIG. 5, to secure the light shield closed.

As shown in FIG. 1, a one-time-use camera 34 with which the film cassette 10 is to be used comprises a main body part 36 that defines a cassette-receiving chamber 38 for the film cassette and a separate film roll chamber 40 for an unexposed roll 42 of the filmstrip 16, and a pair of front and rear cover parts 44 and 46 that house the main body part between them to complete the camera unit. A backframe opening 48 at which successive sections of the filmstrip 16 are to be exposed is located between the cassette-receiving chamber 38 and the film roll chamber 40. A rotatable film winding thumbwheel 50 has a depending coaxial projection 52 that extends through a hole 54 in the main body part 36 to engage one of the exposed ends 18 of the cassette spool 14. The thumbwheel 50 peripherally extends through a slot 56 in the rear cover part 46 to permit the thumbwheel to be manually fingered for rotation. After each film exposure at the backframe opening 48, the thumbwheel 50 is manually rotated in engagement with the cassette spool 14 to wind the exposed section of the filmstrip 16 into the shell interior of the film cassette 10 and to advance a fresh section of the filmstrip from the unexposed film roll 42 to the backframe opening.

A driver 58 extends through a hole 60 in the main body part 36 to engage one of the exposed ends 26 of the rotary shaft 24 of the light shield 22. The driver 58 is rotatable in opening and closing directions 62 and 64 in engagement with the rotary shaft 24 to pivot the light shield 22 open and closed. See FIGS. 1 and 2.

Figure 3:
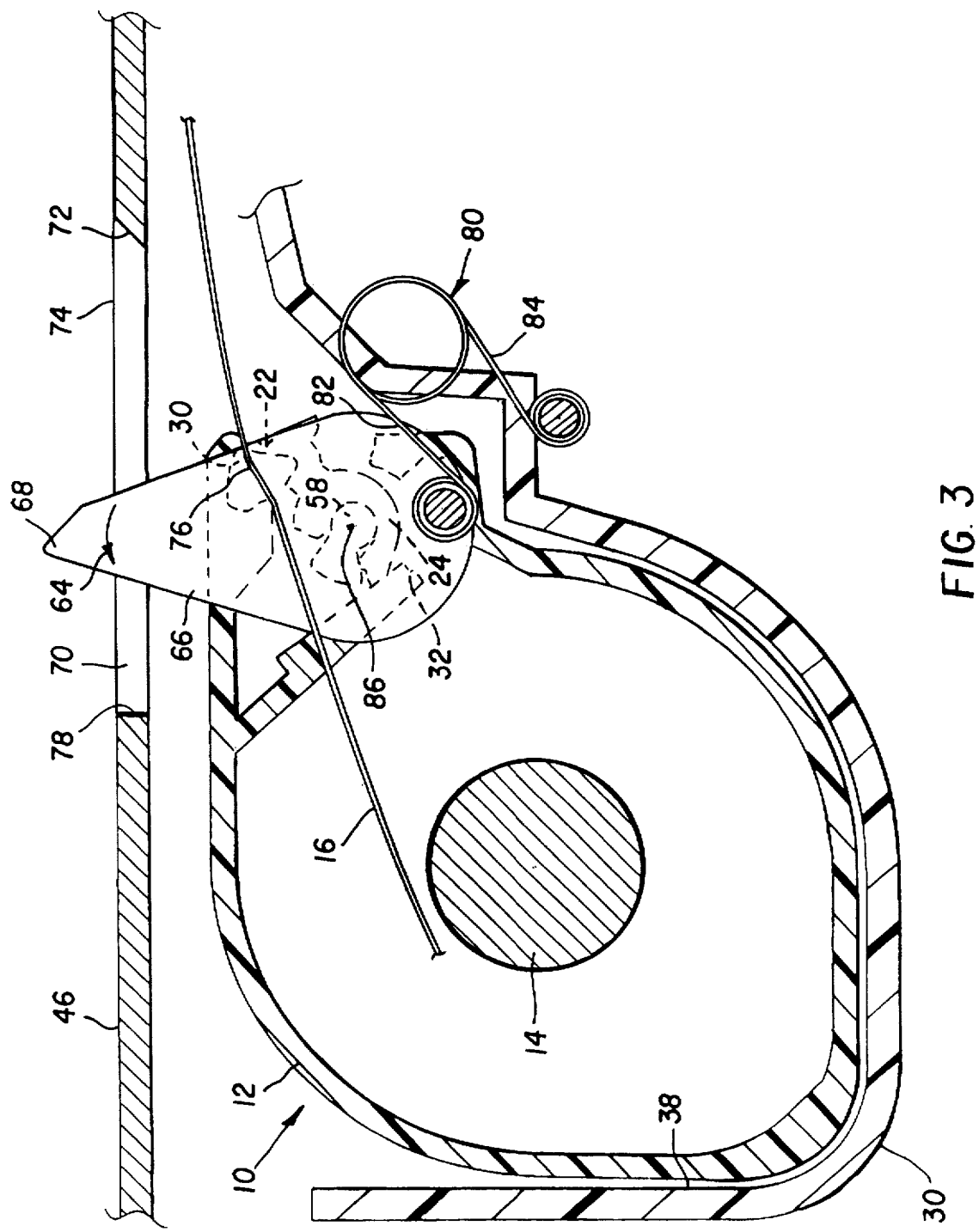
Figure 4:
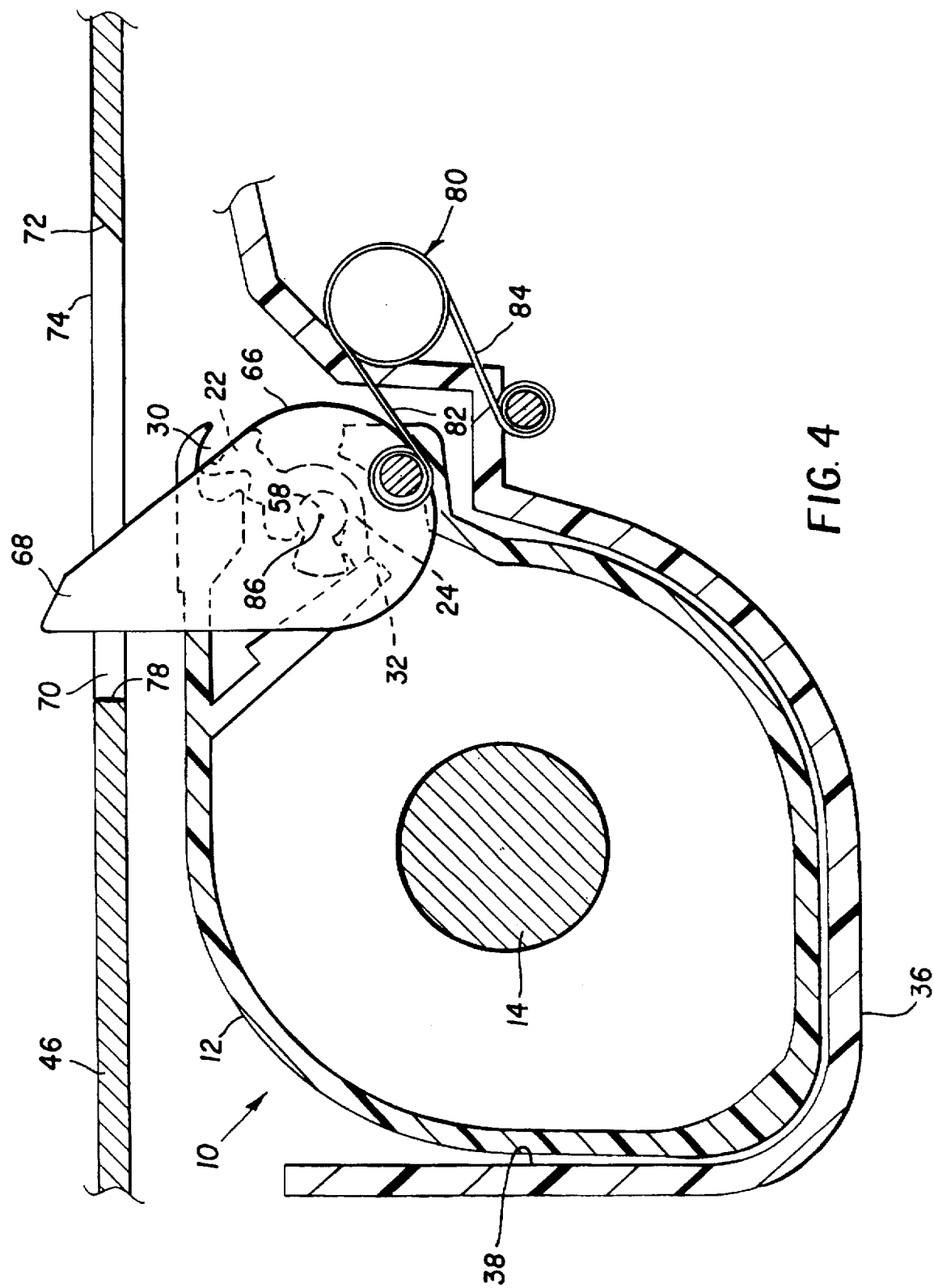

A control lever 66 integrally formed with the driver 58 can be manually rotated in the closing direction 64 to similarly rotate the driver in the same direction to close the light shield 22. See FIGS. 1, 2, 4 and 5. A free end 68 of the control lever 66 is normally located within a slot 70 in the rear cover part 46, as shown in FIG. 2, when the light shield 22 is open. The free end 68 of the control lever 66 is spaced from one end 72 of the slot 70 to leave an access space 74 between the free end and the one end. This permits the free end 68 of the control lever 66 to be grasped within the access space 74 to manually rotate the control lever, beginning with its free end, out of the slot 70 in the closing direction 64 to close the light shield 22, as shown in FIG. 5. If, as shown in FIG. 3, a film section 76 is present in the film passageway 30, the film section will prevent the light shield 22 from being closed. Otherwise, when the light shield 22 is closed, as shown in FIG. 5, the free end 68 of the control lever 66 will come to rest in the slot 70 against another end 78 of the slot. In this instance, there is no access space that permits the free end 68 of the control lever 66 to be grasped to manually rotate the control lever in the opening direction 62 to open the light shield 22. See FIG. 5.

When the free end 68 of the control lever 66 is in the slot 70, at the access space 74 in the slot, as shown in FIG. 2, it serves as a visible warning that the light shield 22 is open. Conversely, when the free end 68 of the control lever 66 is in the slot 70, adjacent the other end 78 of the slot, as shown in FIG. 5, it serves as a visible reminder that the light shield 22 has been closed.

An overcenter spring 80 has one leg 82 connected to the driver 58 to move with the driver and another leg 84 connected to the main body part 36. The overcenter spring 80 can exert respective opening and closing torques in the opening and closing directions 62 and 64 against the driver 58 in accordance with the rotational position of the control lever 66, to alternatively urge the free end 68 of the control lever into the slot 70 at the access space 74 and to urge the free end into the slot adjacent the other end 78 of the slot. See FIGS. 2 and 5. The overcenter spring 80 is adapted to momentarily assume a center equilibrium condition, shown in FIG. 4, in which the opening torque the overcenter spring exerts against the driver 58 is discontinued or reduced to zero and the closing torque the overcenter spring exerts against the driver is begun from zero, when the control lever 66 is rotated part way in the closing direction 64. The axis of rotation 86 of the driver 58 and the site at which the one leg 82 of the overcenter spring 80 is connected to the driver are aligned with the location at which the other leg 84 of the overcenter spring is connected to the main body part 36 when the overcenter spring assumes the center equilibrium position. See FIG. 4. If, as shown in FIG. 3, the film section 76 is present in the film passageway 30, the control lever 66 cannot be rotated sufficiently in the closing direction 64 for the overcenter spring 80 to assume its center equilibrium position, because the film section will prevent the light shield 22 from being closed.

The invention has been described with reference to a preferred embodiment. However, it will be appreciated that variations and modifications can be effected by a person of ordinary skill in the art without departing from the scope of the invention.

PARTS LIST 10. film cassette
12. cassette shell
14. cassette spool
16. filmstrip
18. exposed spool ends
20. end holes
22. light shield
24. shield shaft
26. shaft ends
28. end holes
30. film passageway
32. locking pawl
34. one-time-use camera
36. main body part
38. cassette-receiving chamber
40. film roll chamber
42. unexposed film roll
44. front cover part
46. rear cover part
48. backframe opening
50. film winding thumbwheel
52. thumbwheel projection
54. hole
56. slot
58. driver
60. hole
62. opening direction
64. closing direction
66. control lever
68. free end
70. slot
72. slot end
74. access space
76. film section
78. slot end
80. overcenter spring
82. spring leg
84. spring leg
86. axis

What is claimed is:

1. A camera comprising a housing, a chamber within said housing for a film cassette which includes a light shield that is opened to allow movement of a filmstrip through a film passageway to the cassette interior and is closed to prevent ambient light from entering the cassette interior through the film passageway, and a driver rotatable within said housing in opening and closing directions in engagement with the light shield to open and close the light shield, is characterized in that:

a control lever connected to said driver can be rotationally positioned to protrude out of said housing from a slot in the housing, when the light shield is open, to permit said control lever to be grasped to be manually rotated in the closing direction to close the light shield, and can be positioned not to protrude out of the housing from said slot, when the light shield is closed, to substantially prevent the control lever from being grasped to be manually rotated in the opening direction to open the light shield.

2. A camera as recited in claim 1, wherein said slot has a pair of opposite ends, and said control lever can be rotationally positioned not to protrude out of said housing from said slot, when the light shield is open, with a free end of the control lever in the slot but spaced from one of said ends of the slot to leave an access space in the slot between said free end and said one end to permit the free end to be grasped within said access space to manually rotate the control lever, beginning with its free end, out of the slot in the closing direction to close the light shield.

3. A camera as recited in claim 2, wherein said control lever is rotationally positioned not to protrude out of said housing from said slot, when the light shield is closed, with said free end of the control lever in the slot and adjacent another of said ends of the slot to prevent the free end from being grasped within the slot to manually rotate the control lever out of the slot in the opening direction to open the light shield.

4. A camera as recited in claim 1, wherein an overcenter spring has one leg connected to said driver to move with the driver and another leg connected to a non-movable fixture within said housing to make said overcenter spring exert respective opening and closing torques in the opening and closing directions against the driver in accordance with the rotational position of said control lever to alternatively urge said free end of the control lever into said slot at said access space and to urge the free end into the slot adjacent said other end of the slot.

5. A camera as recited in claim 4, wherein said overcenter spring is adapted to momentarily assume a center equilibrium condition in which the opening torque the overcenter spring exerts against said driver is discontinued, when the control lever is rotated in the closing direction, and said driver is adapted to engage the light shield in order that said overcenter spring does not assume the center equilibrium condition when a film section is located in the film passageway to prevent the light shield from being closed.

6. A camera as recited in claim 5, wherein an axis of rotation of said driver and the site at which said one leg of the overcenter spring is connected to the driver are aligned with the location at which the other leg of the overcenter spring is connected to said fixture when said overcenter spring assumes the center equilibrium position.

* * * * *